United States Patent Office 2,889,204
Patented June 2, 1959

2,889,204

REMOVING SODIUM CHLORATE FROM SOLID SODIUM HYDROXIDE

Robert H. Meyer and Arthur K. Johnson, Concord, Calif., assignors to The Dow Chemical Company, Midland, Mich., a corporation of Delaware No Drawing. Application March 15, 1957
Serial No. 646,196

4 Claims. (Cl. 23—184)

This invention relates to a method of removing sodium chlorate from solid sodium hydroxide and is more particularly concerned with such a method which employs sodium hydride.

Sodium chlorate in solid sodium hydroxide has long presented an impurity problem and its removal by various agents, such as, sucrose, cellulose, iron, ferrous compounds, sodium sulfite, light and heat, etc. have all been used with some degree of success. However, each of these materials has either added other undesirable materials to the caustic, or has required a relatively long reaction time in order to be effective.

It is a principal object of the present invention to provide a method of removing chlorates from solid sodium hydroxide which is rapid and which does not produce undesired impurities. Another object of the present invention is to provide a process for removing sodium chlorate from solid sodium hydroxide which involves the addition of sodium hydride to molten sodium hydroxide. Other objects will become apparent hereinafter.

The foregoing and additional objects have been accomplished by heating solid sodium hydroxide above its melting point and adding an amount of sodium hydride at least stoichiometrically equivalent to the amount of chlorate present in the caustic. The amount of sodium hydride used will be at least equivalent to the amount of chlorate present and is preferably 1.5 stoichiometric times greater than the amount of chlorate present. Quantities greater than this may be employed but their use is economically disadvantageous. Prior to treatment with the sodium hydride, the caustic will be heated to a temperature above its melting point, probably above 330 degrees centigrade, preferably to about 360 degrees centigrade. Within 5 minutes, and usually in less than 2 minutes, the sodium hydride will have reacted with the sodium chlorate to decrease the amount of chlorate present in the caustic.

The process of the present invention not only removes the undesirable chlorates, but reduces some of the metal oxides present so that discoloration resulting from these metal oxides is reduced or eliminated.

The following example is given to illustrate the process of the present invention but is not to be construed as limiting the invention thereto.

*Example*

A mixture of 468 grams of sodium hydroxide and 0.936 gram of sodium chlorate was heated to 360 degrees centigrade in a nickel pot. Analysis of the mixture showed 880 parts per million of sodium chlorate present. A 1.5 to 1 mole ratio (1.8 grams) of sodium hydride was then added to the heated mixture. Within 2 minutes, a sample of the caustic was removed, analyzed, and found to contain 4 parts per million sodium chlorate. The caustic before treatment with sodium hydride was purple, because of the dissolved metal oxides, but after treatment was white.

Various modifications may be made in the method of the present invention without departing from the spirit or scope thereof and it is to be understood that we limit ourselves only as defined in the appended claims.

We claim:

1. A process for reducing the amount of sodium chlorate in intimate admixture with sodium hydroxide, which comprises: heating said mixture to a temperature above 300 degrees centigrade, and adding a 1.5 to 1 stoichiometric equivalent of sodium hydride based on the chlorate present thereto.

2. A process for reducing the amount of sodium chlorate in intimate admixture with sodium hydroxide, which comprises: heating said mixture to a temperature above 300 degrees centigrade, adding a 1.5 to 1 stoichiometric equivalent of sodium hydride based on the chlorate present thereto, and, maintaining the resulting mixture of sodium hydride and sodium hydroxide at a temperature above 300 degrees centigrade for at least 2 minutes.

3. A process for reducing the amount of sodium chlorate contained in intimate mixture with sodium hydroxide which comprises: adding sodium hydride to molten sodium hydroxide in an amount at least stoichiometrically equivalent to the chlorate present.

4. A process for reducing the amount of sodium chlorate contained in intimate mixture with sodium hydroxide which comprises: adding a 1.5 to 1 stoichiometric equivalent of sodium hydride based on the chlorate present to molten sodium hydroxide and maintaining said sodium hydroxide molten for at least two minutes after said addition.

References Cited in the file of this patent

FOREIGN PATENTS 642,946    Great Britain _____ Sept. 13, 1950

OTHER REFERENCES

Hurd: "An Introduction to the Chemistry of the Hydrides," John Wiley and Sons, New York, pages 31 and 32.